No. 634,856. Patented Oct. 10, 1899.
A. B. SHAW.
TIME GAS LIGHTING OR EXTINGUISHING MECHANISM.
(Application filed May 31, 1899.)
(No Model.) 2 Sheets—Sheet 1.
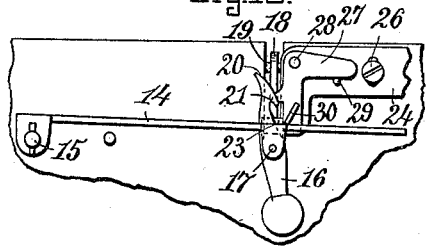
Fig.10.
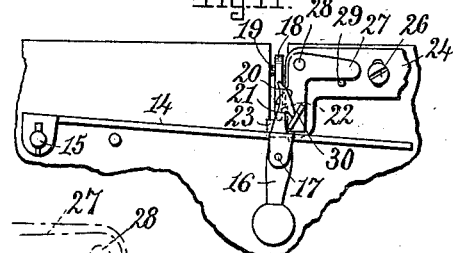
Fig.11.
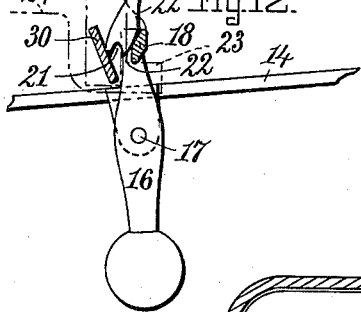
Fig.12.
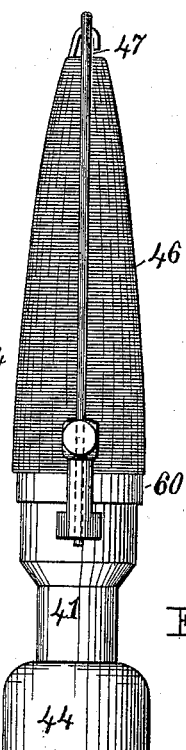
Fig.1.
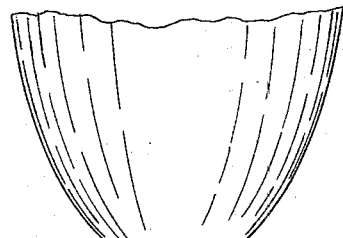
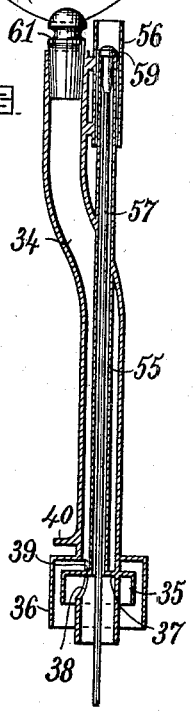
Fig.13.
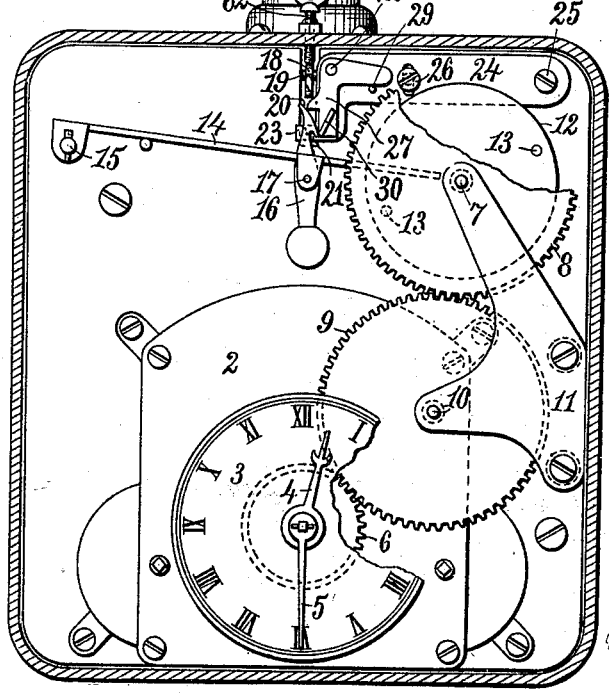
Witnesses
Inventor
Ai B. Shaw
by
Henry Chadbourne
his Atty.
THE NORRIS PETERS CO., PHOTO-LITHO., WASHINGTON, D. C.

No. 634,856. Patented Oct. 10, 1899.
A. B. SHAW.
TIME GAS LIGHTING OR EXTINGUISHING MECHANISM.
(Application filed May 31, 1899.)
(No Model.) 2 Sheets—Sheet 2.
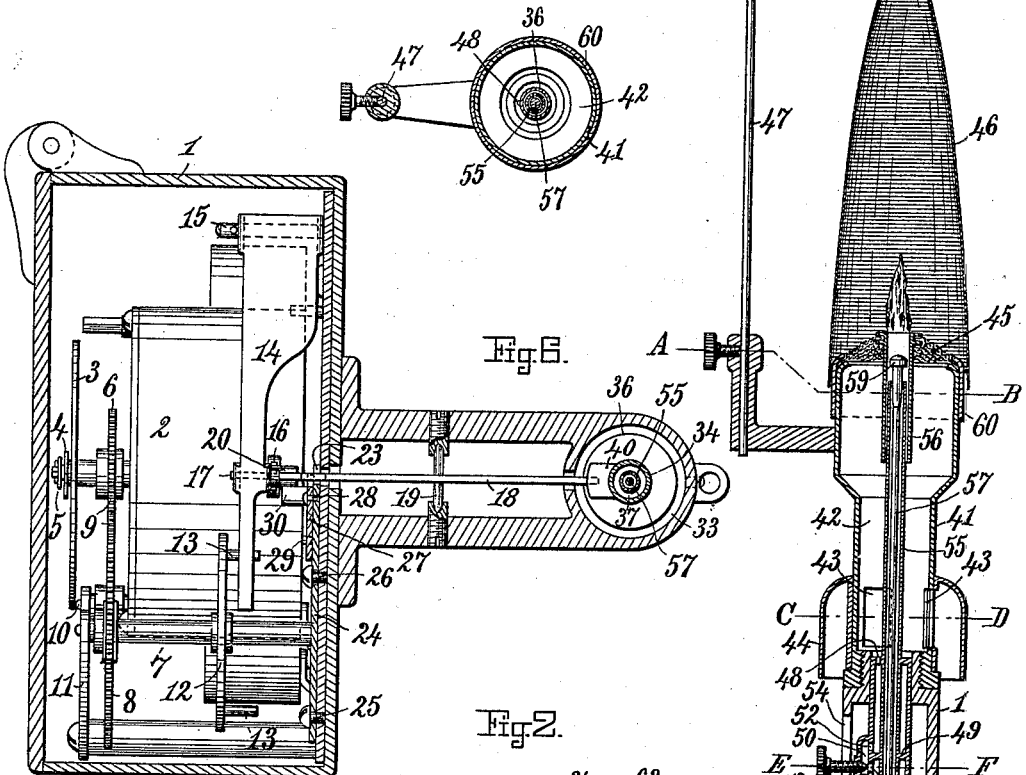
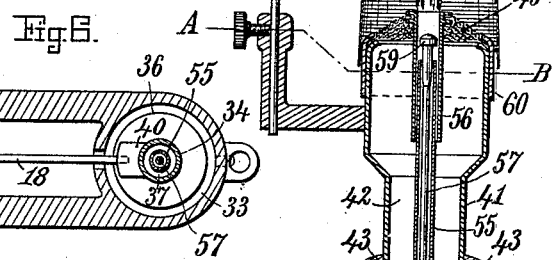
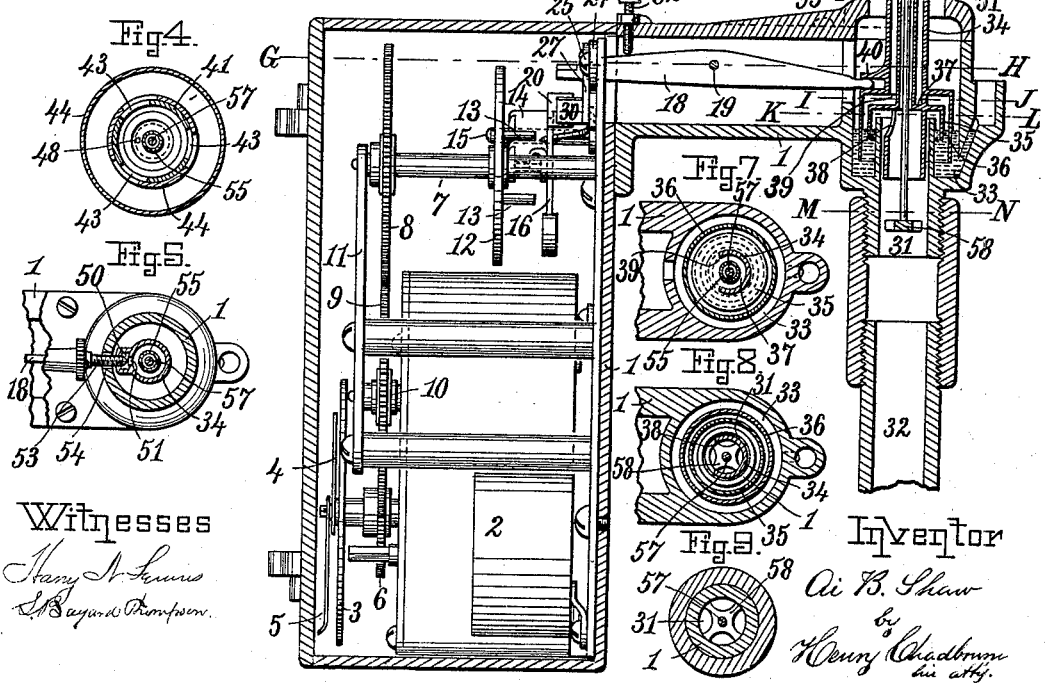
Witnesses
Harry N. Lewis
S. Bayard Thompson
Inventor
Ai B. Shaw
by Henry Chadbourn
his atty.
THE NORRIS PETERS CO., PHOTO-LITHO., WASHINGTON, D. C.

United States Patent Office.

AI B. SHAW, OF MEDFORD, MASSACHUSETTS, ASSIGNOR TO THE UNITED STATES AUTOMATIC GAS LIGHTING COMPANY, OF AUBURN, MAINE.

TIME GAS LIGHTING OR EXTINGUISHING MECHANISM.

SPECIFICATION forming part of Letters Patent No. 634,856, dated October 10, 1899.

Application filed May 31, 1899. Serial No. 718,880. (No model.)

*To all whom it may concern:*

Be it known that I, AI B. SHAW, of Medford, in the county of Middlesex and State of Massachusetts, have invented certain new and useful Improvements in Automatic Gas Lighting and Extinguishing Mechanisms, of which the following is a specification.

This invention relates to improvements in automatic gas lighting and extinguishing devices whereby the gas-burner is automatically lighted or extinguished at predetermined times, and it is designed more especially to be used in connection with burners having incandescent mantles or what is known to the trade as "Welsbach" burners, and to be used for lighting streets, &c.

It has for its object to produce a more simple and cheaper device than those now in use for this purpose and one which will be less liable to get out of order and be more certain of operation.

This invention consists of the novel constructions, arrangements, and combinations of parts, as will be fully described hereinafter and particularly set forth in the claims hereunto annexed and forming a part thereof.

The invention is carried out substantially as illustrated on the accompanying drawings, forming an essential part of this specification, common and well-known equivalent devices to those shown being understood to be included in my invention.

On the drawings, Figure 1 represents a front elevation of the device when applied to a mantle-burner, showing the inclosing case in section. Fig. 2 represents a vertical longitudinal section of the device, also showing it applied to a mantle-burner. Fig. 3 represents a cross-section on the line A B, shown in Fig. 2. Fig. 4 represents a cross-section on the line C D, shown in Fig. 2. Fig. 5 represents a cross-section on the line E F, shown in Fig. 2. Fig. 6 represents a cross-section on the line G H, shown in Fig. 2. Fig. 7 represents a cross-section on the line I J, shown in Fig. 2. Fig. 8 represents a cross-section on the line K L, shown in Fig. 2. Fig. 9 represents a cross-section on the line M N, shown in Fig. 2. Figs. 10, 11, and 12 represent detailed views of a portion of the intermediate mechanism between the gas-controlling valve and the driving mechanism of the device employed to cause the gas-controlling valve to be alternately opened or closed when acted upon by the driving mechanism. Fig. 13 represents a detail sectional view of the gas-controlling valve and connecting mechanism when used with a common burner having a lava or other tip.

Like characters of reference refer to like parts wherever they occur on the different parts of the drawings.

The object of my present invention is to provide a gas-controlling valve and a device to light the gas which is allowed to escape by the operation of this valve, which valve and device shall be so connected to the motor which drives the time-determining mechanism and be so easy of operation that it can be operated by said time-determining motor without materially taxing the power or interfering with the accuracy of the time mechanism and without the use of a separate and independent motor for this purpose. By this means I am able to simplify the construction of devices used for this purpose, and thus make them less bulky or expensive to manufacture and less liable to get out of order.

Within an inclosing casing 1 of suitable shape is placed a time mechanism 2, driven by a spring, weight, or other motor in common use to furnish a motive power for a time mechanism. The time mechanism 2 is provided with a face 3 and hands 4 and 5, as usual. Upon the center shaft, or that carrying the hour-hand 4, is mounted a spur-gear 6, from which motion is conveyed to a shaft 7 by a suitable train of gears, shown on the drawings as consisting of the spur-gear 8, firmly mounted on the shaft 7, meshing into an intermediate spur-gear 9, mounted upon a shaft 10, having bearings in a suitable frame 11 within the casing 1, the intermediate gear itself meshing into the gear 6. The relative sizes of the gears 6, 8, and 9 are preferably such that two rotations of the gear 6, representing one day or twenty-four hours, will cause one complete rotation of the gear 8 or the shaft carrying it. Upon the shaft 7 is also firmly mounted a disk 12, having two pins 13 13 projecting therefrom and arranged upon said disk in suitable position for a purpose to be understood by a further description of the invention.

A lever 14 is fulcrumed at 15 to the frame 11 or to the casing 1 and has its free end arranged to be within the path of the pins 13 13 on the disk 12 when said disk is rotated with the rotations of the shaft 7. The pins 13 engage the under side of the free end of the lever 14 and by the rotation of the disk cause said lever to turn upon its fulcrum and to move upward until the disk has rotated sufficiently to carry the pin from under the lever, when the weight of the lever will cause it to turn upon its fulcrum and to move downward. The downward movement of the lever upon its fulcrum is limited by a suitable stop.

A pawl 16 is fulcrumed at 17 to the lever 14 and moves upward and downward with said lever. This pawl is weighted, so as to normally stand in a vertical position, but is free to be turned upon its fulcrum against the influence of its weight, as hereinafter described.

A lever 18 is fulcrumed at 19 within the casing and has one end so arranged that it will be in the path of the pawl 16 when said pawl is moved upward by the action of the pins 13 upon the lever 14. The pawl 16 (the shape of which is best illustrated in Fig. 12) is provided with the inclined surface 20, the hook 21, and the inclined surface 22. When the lever 18 is in the position shown in Figs. 1 and 2 and the pawl is moved upward, with the lever 14, by the action of the pins 13, the inclined surface 20 of the pawl will engage the under side of the lever 18, which will cause the pawl to be turned upon its fulcrum until it has moved sufficiently to allow the pawl to pass the end of the lever, when the pawl will automatically assume its normal or vertical position. When the lever 14 is released from the action of the pin 13 and moved downward by its own weight, carrying the pawl 16 with it, the hook 21 will hook upon the upper side of the lever 18 and carry that end of the lever downward with the pawl and the lever 14. This will cause the lever 18 to turn upon its fulcrum and the opposite end to be moved upward. A suitable stop 23 is arranged within the path of the downward movement of the end of the lever 18 in order to limit its movement, and this stop is preferably made adjustable up and down to vary the amount of movement of said lever. In order to make said stop adjustable, I make it a part of the plate 24, which is fulcrumed at 25 to the frame 11 or to the casing 1 and is held in its adjusted position by means of the screw 26, passing through a slot in the plate and screwed into the frame 11 or into the casing 1. The plate 24 also has a detent-pawl 27, which is in the shape of a bell-crank and is fulcrumed at 28 to the plate 24 in such a manner that it normally moves over the lever 18 when said lever is in the position shown in Fig. 11 and is stopped by coming into contact with the stop 23, said detent-pawl being limited in its movement by means of a suitable stop 29 on the plate 24. This detent-pawl tends to hold the end of the lever 18 downward independent of the pawl 16 after the pawl has moved the end of the lever down. After the pawl 16 has depressed the end of the lever 18, as above described, and said lever has been stopped by the stop 23 and locked in that position by the detent-pawl 27 the pawl 16 will remain hooked upon the upper side of the lever 18 until another pin 13 rotates sufficiently to come into contact with the upper side of the lever 14, and by moving said lever upward moves the pawl 16 upward from contact with the lever 18, leaving the lever 18 held in the position shown in Figs. 10 and 11 by means of the stop 23 and detent-pawl 27.

The detent-pawl 27 is provided with the projection 30, having the inclined surface substantially as shown, which surface is in the path of the upper edge of the lever 18 when said pawl drops downward with the lever 14 after the pin 13 has moved from contact with the lever 14 and allowed said lever to move downward. The action of the inclined surface 22 upon the upper edge of the lever 18 is such that it causes the detent-pawl to be moved to one side and from contact with the end of the lever 18 and into such a position that the lever 18 is free to move upon its fulcrum. As the opposite end of said lever carries a weight, as will be understood by a further description, said freed end of the lever 18 will immediately move upward when released by the movement of the detent-pawl above described.

It will be seen that each complete upward and downward movement of the lever 14, caused by the action of the pins 13, will alternately move the end of the lever 18 downward and lock it or will release it and allow it to move upward. This alternate up-and-down movement of the lever 18 I employ to open and close a valve controlling the supply of gas to the burner, and this valve and connecting mechanism between the valve and lever 18 and between the valve and burner are substantially as follows: The casing 1 is provided with the inlet 31, which is connected to the gas-supply pipe 32 by any suitable and well-known means. An annular reservoir or pocket 33 within the casing surrounds this inlet and contains a quantity of mercury or other liquid, which is preferably such that it will not freeze in very cold or evaporate in very hot and dry weather. This mercury or other liquid forms a seal between the inlet 31 and a passage leading to the burner, which seal is made or broken by the manipulation of a peculiar valve, described hereinafter, in order to allow gas to be supplied to the burner or to shut off the supply of gas, as desired.

The valve which in connection with the mercury is used to control the supply of gas to the burner is constructed substantially as follows: A tube 34, arranged vertically, is loosely mounted at its lower end within the inlet 31 and at its upper end within a guide in the inclosing casing. This tube is provided with two inverted cups 35 and 36, secured near the lower end of the tube and surrounding it, substantially as shown. These cups of different sizes are arranged one within the other and are so secured to the tube that there will be a space formed between all parts of the two cups, as shown. The lower edge of the inner cup 35 is above the lower edge of the outer cup 36 for a purpose to be understood by a further description of the invention. A cross wall or stopper 37 is placed within the tube 34 at a position substantially on a level with the place where the inner cup 35 is secured to the tube 34, which stopper tends to prevent gas from passing upward through the tube 34 directly from the supply-inlet 31. A perforation 38 through the tube 34 furnishes free communication between the interior of said tube below the cross-wall 37 and the interior of the inner inverted cup 35. A second perforation 39 through the tube 34 furnishes free communication between the interior of said tube above the cross-wall 37 and the space between the inner cup 35 and the outer cup 36. The inner inverted cup 35 is so arranged that its lower edge normally enters the mercury within the reservoir 33, and thereby forms a seal preventing the escape of gas from within the inner cup; but said inner cup may be raised by an upward movement of the tube 34, so that the lower edge of the cup will be above the mercury and gas can escape. The lower edge of the outer inverted cup 36 is also so arranged that it enters the mercury and forms a seal to prevent the escape of gas from within this outer cup, and the lower edge of the outer cup extends sufficiently below the lower edge of the inner cup to prevent the outer cup from being withdrawn from the mercury by an upward movement of the tube 34 sufficiently to allow the gas to escape from the inner cup into the outer cup. From the above description it will be seen that the inner inverted cup 35, in connection with the mercury in the reservoir 33, forms a valve controlling the escape of gas from the gas-supply pipe through the tube 34 below the cross-wall 37 and that the outer inverted cup 36, in connection with the mercury in the reservoir 33, forms a passage to guide the gas which may be allowed to escape by the operation of the inner cup from said inner cup into the tube 34 above the cross-wall 37.

The end of the lever 18 opposite to that which is engaged by the pawl 16 enters a space between the upper end of the outer cup 36 and a projection 40 on the outside of the tube 34, and by this means the lever 18 and the tube 34 are coupled together, so that any movement of that end of the lever 18 will impart a corresponding movement of the tube 34, causing the valve formed by the inverted cups 35 and 36 to open or close the supply of gas from the supply-pipe 32 to the tube 34 above the cross-wall 37. As the movements of the lever 18 are controlled by the action of the pawl 16 and lever 14, above described, it will be seen that gas will be supplied to the tube 34 above the cross-wall 37 once in every twenty-four hours and will also be cut off once in every twenty-four hours.

In Figs. 1 to 5, both inclusive, I have illustrated a mantle-burner similar to that known as a "Welsbach" burner, as being used in connection with my improved automatic gas lighting and extinguishing mechanism, which burner consists of a casing or shell 41, containing a mixing-chamber 42, into which air to be mixed with the gas is admitted through the series of perforations 43 43, regulated in size and shielded by means of the adjusting-sleeve, the shield 44, a gauze 45, through which the mixed air and gas escapes from the mixing-chamber, a mantle 46, into which the gas and air escapes and is consumed, and a support 47 for said mantle. The shell 41, mixing-chamber 42, perforations 43, shield 44, gauze 45, mantle 46, and support 47 are of the common and well-known construction of mantle-burners and may be varied by the use of any other and proper construction without departing from my invention. The gas escapes from the tube 34 into the mixing-chamber 42 through a small perforation or perforations 48, made within the closed upper end of the tube 34, and the amount of gas which will escape and the pressure on said gas are regulated, preferably, in the following manner: The tube 34 is provided with a cross-wall 49, which prevents the gas from flowing directly through the tube. A passage 50 is formed outside of the tube 34 and communicates with the interior of the tube 34 by means of the perforations 51 and 52 made through the tube, one of said perforations being made above and one below the cross-wall 49. An adjusting-screw valve 53 is screwed through the wall of the passage 50 and is so arranged that its inner end can be moved so as to partially fill or vary the size of the perforation 51 more or less, as desired, thus regulating the amount of gas which can flow from the tube 34 below the cross-wall 49 and into the passage 50. The screw 53 extends out through a slotted opening 54 in the casing in order to bring it into proper position to easily adjust the flow of gas from outside the casing, the slotted opening also allowing for the vertical movement of the tube 34 when said tube is moved to supply gas to the burner or to cut off the supply. This screw and slot also prevent any rotation of the tube 34 and its connections.

Within the tube 34 and passing through the cross-walls 37 and 49 and through the closed end of the tube 34 is a central tube 55, which is in open communication with the gas-supply pipe 32 at its lower end. This tube 55 is firmly secured to or made in one piece with the tube 34, so that it will move with it when the tube 34 is raised or lowered by the action of the lever 18. The upper end of the tube 55 extends into a tubular projection 56, projecting downward from the under side of the gauze 45, which projection surrounds a central perforation in the gauze. A rod 57 of less diameter than the inner diameter of the tube 55 is inserted within the tube 55 and has its lower end resting upon a cross-bar 58 in the inlet-passage 31, which cross-bar does not furnish any particular obstruction to the flow of gas through the inlet-passage. The upper end of the rod 57 projects above the upper end of the tube 55, and said rod is provided at its upper end, within the tubular projection 56, with a head portion 59 of a diameter substantially equal to the outside diameter of the tube 55. This rod is of such length that its head portion will come into contact with the upper end of the tube 55 and will close the end of said tube against the escape of gas therefrom when the tubes 34 and 55 are raised by the action of the lever 18 and gas is furnished to the burner by drawing the inverted cup 35 from contact with the mercury; but said rod will rest upon the cross-bar 58 and cause the tube 55 to move downward upon said rod, allowing a small quantity of gas to escape between the rod and inside of the tube 55, when the tubes 34 and 55 move downward by the action of the lever 18, and the supply of gas is thereby cut off from the burner. The small quantity of gas which escapes from the tube 55 rises within the tubular projection 56, ignites at the central perforation in the gauze 45, and forms a pilot-burner by which the main burner is lighted when the gas is supplied to the main burner. The head portion 59 of the rod in connecting with the tube 55 forms a valve to control the supply of gas to this pilot-burner. The opening and closing of the valves which control the supply of gas to the pilot-burner and to the main burner are so timed in relation to each other that the pilot-burner will never be extinguished before the main burner has been lighted and the main burner will never be extinguished before the pilot-burner has been lighted. By having the head portion of the rod 57 and the upper end of the tube 55, which together form the valve for the pilot-burner, always within the tubular projection 56 from the gauze 45 and somewhat below the upper open end of said tubular projection the place of combustion is always above said valve, and consequently there is no liability of burning the valve or of having it become foul by the products of the combustion of the gas burned by the pilot-burner.

The gauze 45 and its tubular projection 56 are held upon the upper end of the shell 41, preferably by means of the sleeve 60, substantially as shown, and this gauze may be firmly secured to said sleeve, if so desired. By this means the gauze and projection may be easily and readily removed after removing the mantle and the rod be withdrawn from the tube to clean or to repair it.

By making the valve which controls the supply of gas to the main burner in the manner shown there is no liability of the gas leaking through this valve, and by making the tube 34 and connections thereto, which are raised and lowered in order to open or close the supply of gas to the main burner and to the pilot-burner, of very light material there is very little power required to be stored within the lever 14 by the time mechanism to operate this valve. Therefore it does not overtax or interfere with the accuracy of said time mechanism.

In Fig. 13 I have illustrated the valves which control the gas-supply to the burners when a common gas-burner is to be used in my apparatus. In this construction the tube 34 is extended and offset substantially as shown, and the common lava or other tip 61 is inserted in the end of the tube 34. The tubular projection 56, the open end of which forms the pilot-burner, is attached to the tube 34, near the top of the same, and moves with it. The operation of this construction of my device is substantially the same as that shown in the other views of the drawings and needs no particular description.

The above-described valves which control the supply of gas to the main burner and to the pilot-burners, as well as the peculiar construction of the passages which convey the gas from the gas-supply to said burners, are used in this application merely on account of their being particularly adapted to be used with the remaining parts of my improved mechanism, and the construction of said valves and passages in themselves form no essential part of this application, but are to be embodied in an application to be filed during the pendency of this application. They will, however, be included in the following claims in combination with other parts of the mechanism which coöperate therewith to produce novel and desired results.

It is desirable to adjust the depth that the inverted cup 35 will enter the mercury when closing the supply of gas to the main burner, so as to insure its closing said supply, but not to enter the mercury to too great a depth. In order to accomplish this, I provide the casing with the adjustable stop 62, which acts upon the lever 18 to limit the downward movement of the tube 34 and its connection, substantially as shown.

Having thus fully described the nature, construction, and operation of my invention, I wish to secure by Letters Patent and claim—

1. In an automatic gas lighting and extinguishing device, a time mechanism, a gas-burner, a reservoir containing liquid, a valve controlling the supply of gas to the burner consisting of a vertically-movable tube with a cross-wall dividing it, two inverted cups, one within the other, attached to and movable with said tubes but normally entering the liquid in the reservoir, perforations in the tube above and below the cross-wall forming communication respectively with the outer and inner cup, and intermediate mechanism between the time mechanism and the valve, intermittingly operated by the time mechanism to alternately raise and lower said valve, to supply gas to the burner or to cut off the supply, for the purpose set forth.

2. In an automatic gas lighting and extinguishing device a time mechanism, a main gas-burner, a pilot-burner, a reservoir containing liquid, a valve controlling the supply of gas to the main burner consisting of a vertically-movable tube with a cross-wall dividing it into an upper and lower passage, two inverted cups one within the other attached to and movable with said tube but normally entering the liquid into the reservoir, and perforations in the tube above and below the cross-wall forming communication respectively with the outer and inner cups, a second tube attached to and vertically movable with the first-named vertically-movable tube forming communication between the gas-supply and the pilot-burner, a stationary rod forming a valve in connection with said second vertical movable tube to control the supply of gas to the pilot-burner, and intermediate mechanism between the time mechanism and the vertically-movable tubes intermittingly operated by the time mechanism to alternately raise and lower said tubes to operate the valves controlling the supply of gas to said burners, for the purpose set forth.

3. In an automatic gas lighting and extinguishing device, a time mechanism, a main gas-burner, a pilot-burner, a valve controlling the supply of gas to said burner, and intermediate mechanism between said time mechanism and said valve consisting of a rocking lever, one end of which is in engagement with said valve, a pivoted lever intermittingly raised by said time mechanism and allowed to drop when released from said mechanism, an automatic locking device to lock the free end of said rock-lever in its lowest position, and a pawl carried by the lever which is operated by the time mechanism and alternately depresses the free end of the rock-lever, or releases it from the locking device at each complete up-and-down movement of said pawl, for the purpose set forth.

4. In an automatic gas lighting and extinguishing device, a time mechanism, a main gas-burner, a pilot-burner, a reservoir containing liquid, a valve controlling the supply of gas to the main burner, consisting of a tube, a cross-wall tending to prevent gas from passing through said tube, two inverted cups one within the other, entering the liquid in the reservoir and attached to the tube, the inner cup in open communication with the supply-inlet and a perforation in the tube above the cross-wall, forming free communication between the tube above the cross-wall and the space between the two inverted cups, and intermediate mechanism between the time mechanism and the valve intermittingly operated by the time mechanism to alternately raise and lower said valve to supply gas to the main burner, or to cut off the supply, for the purpose set forth.

5. In an automatic gas lighting and extinguishing mechanism, a time mechanism, a main and a pilot gas-burner, a gas-supply, a valve controlling the supply of gas to the main burner by an up-and-down movement of said valve, a rock-lever operating said valve, a locking-pawl to lock said lever in position when the valve is raised, a pivoted lever acted upon by the time mechanism to move said lever upward and to allow it to drop, and a hooked weighted pawl carried by said pivoted lever and having inclined surfaces to engage the rock-lever and the locking-pawl, whereby the rock-lever is engaged and its free end depressed by the hooked pawl and locked in that position by one complete up-and-down movement of the pivoted lever and pawl, and is released from the locking-pawl and allowed to return to its normal position by the next complete up-and-down movement of the pivoted lever and pawl, to alternately open and close said valve, for the purpose set forth.

In testimony whereof I have affixed my signature in presence of two witnesses.

AI B. SHAW.

Witnesses:
J. F. O'CONNOR,
HENRY CHADBOURN.